United States Patent [19]

Ubukata et al.

[11] Patent Number: 4,791,329

[45] Date of Patent: Dec. 13, 1988

[54] MOTOR PROTECTOR MOUNTING STRUCTURE FOR ENCLOSED ELECTRIC COMPRESSORS

[75] Inventors: Susumu Ubukata, 549-banchi, Nakasuna-cho, Tempaku-ku, Nagoya, Aichi; Yasukazu Mizutani; Syozo Iyoda, both of Nagoya, all of Japan

[73] Assignee: Susumu Ubukata, Japan

[21] Appl. No.: 60,089

[22] Filed: Jun. 9, 1987

[30] Foreign Application Priority Data

Jun. 16, 1986 [JP] Japan .............................. 61-139901
Jul. 19, 1986 [JP] Japan .............................. 61-170442
Jul. 31, 1986 [JP] Japan .............................. 61-180480

[51] Int. Cl.$^4$ .................... H02K 11/00; H02H 7/085
[52] U.S. Cl. .................................. 310/68 C; 310/89; 337/380
[58] Field of Search ............ 200/DIG. 28; 310/68 C, 310/71, 88, 89, 87; 337/380; 361/22, 24, 25, 26, 32; 439/621, 622

[56] References Cited

U.S. PATENT DOCUMENTS

| | | | |
|---|---|---|---|
| 2,474,190 | 6/1949 | Porter | 337/380 |
| 4,236,092 | 11/1980 | DiFlora | 310/68 C |
| 4,319,299 | 3/1982 | Woods et al. | 361/26 |
| 4,499,517 | 2/1985 | Lisauskas | 310/68 C |
| 4,611,138 | 9/1986 | Kindig et al. | 310/71 |

Primary Examiner—Patrick R. Salce
Assistant Examiner—D. L. Rebsch
Attorney, Agent, or Firm—Steele, Gould & Fried

[57] ABSTRACT

A structure for mounting a motor protector substantially as a thermally responsive switch in an enclosed electric compressor including an electric motor and a compressing means provided in a closed housing. The structure includes a terminal support provided airtightly through an upper wall of the compressor housing, a plurality of conductive pins for connecting an external power-supply circuit to the motor, the conductive pins projecting inside and outside the terminal support. One of the inner conductive pins is conductively connected to a terminal pin provided in the motor protector or to an equivalent thereof. Thus, the motor protector is disposed and held within the compressor housing so that heat is exchanged between the motor protector and a coolant gas. A motor winding is connected to the other terminals and the other conductive pins provided in the terminal support.

5 Claims, 5 Drawing Sheets

MOTOR PROTECTOR MOUNTING STRUCTURE FOR ENCLOSED ELECTRIC COMPRESSORS

BACKGROUND OF THE INVENTION

1. Field of the Invention

This invention relates generally to motor protectors for protecting electric motors in sealed electric compressors against overload, and more particularly to a structure for mounting the motor protector, including a thermally responsive switch means making and breaking a power-supply circuit to the motor between a fixed contact and a movable contact secured to a bimetallic or other metallic thermally responsive member, which deforms in response to the changes of the temperature.

2. Description of the Prior Art

Conventional motor protectors for enclosed electric compressors are substantially thermally responsive switches. The thermally responsive switch is mounted outside or inside of a sealed housing in which an electric motor and a compressing means are provided. An overcurrent flowing into the motor or abnormal increase of the motor temperature is sensed by the thermally responsive switch, which opens contacts, to thereby interrupt the current flowing into the motor. The thermally responsive switch thus protects motor windings against overheat. The contacts of the thermally responsive switch are automatically reclosed afterwards to thereby allow the current to flow into the motor. If there is nothing wrong with the motor, the current is continuously fed to the motor. If there is anything wrong with the motor, making and breaking the power-supply circuit are alternately reiterated.

The motor protector of the type mentioned above has recently been mounted inside the sealed housing of the compressor rather than outside the sealed housing for improvement of motor protecting characteristics thereof. The motor protectors mounted inside the sealed compressor housing will hereinafter be referred to as "internal motor protectors" and those mounted outside the sealed compressor housing as "external motor protectors." Conventionally, the internal motor protector is embedded in a stator winding of the motor or placed close to the winding to be bound with strings, together with the stator winding. Since the sealed electric compressor has recently been rendered more and more compact, there is small space left within the sealed compressor housing in which the motor and the compressing means are provided. Consequently, it has become more and more difficult to ensure the space for mounting the motor protector on the stator winding. There has been a continuous need for solving the above-described problem, together with an economical solution for improvement of troublesome work in mounting the motor protector in the enclosed compressor.

SUMMARY OF THE INVENTION

It is, therefore, a primary object of this invention to provide an improved motor protector mounting structure for enclosed electric compressors wherein a thermally responsive switch means for protection of the motor winding is mounted within a closed compressor housing enclosing an electric motor and a compressing means, without requiring a large space in the compressor housing.

It is a second object of this invention to provide a motor protector mounting structure for enclosed electric compressors wherein the work of mounting the thermally responsive switch means within the compressor housing can be simplified.

In one aspect of this invention, the motor protector mounting structure for enclosed electric compressors comprises a terminal support provided on a wall of a compressor housing in which a motor and a compressing means are provided, and a socket combined with the terminal support within the compressor housing. The terminal support has a plurality of electrically conductive pins, each one end of which projects out of the terminal support within the compressor housing. The socket is provided with receptacles engaged with a terminal of a thermally responsive switch means and the conductive pins, respectively. One of the receptacles is connected to one of the terminals of the thermally responsive switch means within the socket. An end of a motor winding is connected to the other terminal of the thermally responsive switch means and the other receptacles. An external circuit such as a power-supply circuit for the motor is connected to the conductive pins provided in the terminal support at the outside of the enclosed compressor housing.

According to the above-described construction, the thermally responsive switch means as a motor protector is provided within the socket and held therein firmly. Consequently, a large space is not required within the housing, particularly in the vicinity of the motor winding. Further, troublesome work is not required to bind the thermally responsive switch means to the motor winding with strings.

In a second aspect of this invention, the socket is not employed and one of the terminals of the thermally responsive switch means is mechanically connected to one of the receptacles with a conductive support provided therebetween and held in position, instead of the socket. One end of a coil wire forming the motor winding is directly connected to the other receptacle and the other terminal of the thermally responsive switch means.

In a third aspect of this invention, the conductive support in the above-described second aspect is eliminated. Instead, a receptacle is conductively secured to an outer surface of a metallic protector housing in which a pair of contacts and a thermally responsive member are provided. The receptacle is engaged with the conductive pins provided in the terminal support. Consequently, the thermally responsive switch means is held by the terminal support.

In each of the above-described aspects of this invention, heat is transferred from the motor winding to the thermally responsive switch means by a compressed coolant gas, which passes by the motor within the sealed compressor housing to be thereby discharged through an exhaust pipe.

Other and further objects of the present invention will become obvious upon an understanding of the illustrative embodiments about to be described or will be indicated in the appended claims, and various advantages not referred to herein will occur to one skilled in the art upon employment of the invention in practice.

DESCRIPTION OF THE PREFERRED EMBODIMENTS

Figure 1:
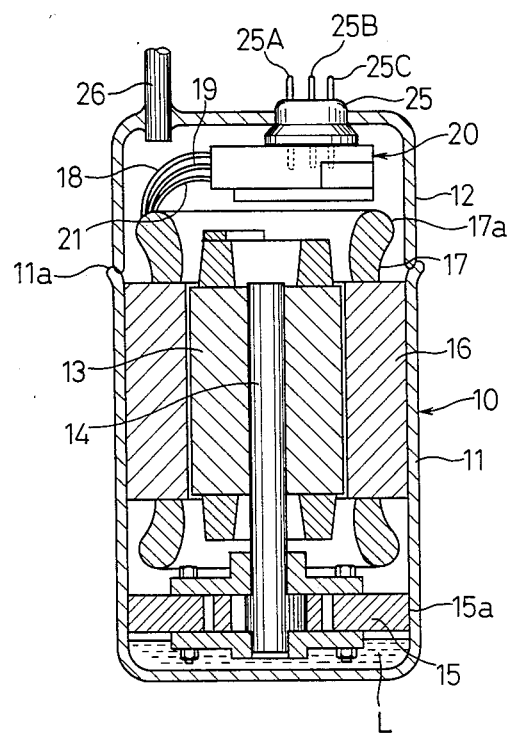
FIG. 1 is a longitudinal section of the enclosed electric compressor wherein the motor protector mounting structure of a first embodiment is employed.

FIG. 1 illustrates an overall construction of an enclosed electric compressor employing the motor protector mounting structure of a first embodiment. A compressor housing 10 includes a sturdy steel body 11 having open and closed ends and a lid 12. A compressing means 15 is provided in the vicinity of the lower end of a shaft 14 fixed to a rotor 13 of an electric motor such as a single phase induction motor and its outer peripheral portion 15a is secured to the inside surface of the body 11. An outer peripheral portion of a motor stator 16 surrounding the rotor 13 extends from the inner central portion of the compressor housing 10 to the vicinity of the body 11 in the axial direction and is secured to the inside surface of the body 11 over its entire length. Stator windings 17 electrically insulated are wound to the motor stator 16. End turns 17a of the stator windings 17 are bound with a piece of nylon string. A coolant gas such as freon (not shown) is provided within the compressor housing 10, so that the end turns 7a are exposed to the coolant gas. A certain amount of lubricating oil L is provided at the underside portion of the housing 10.

Figure 2:
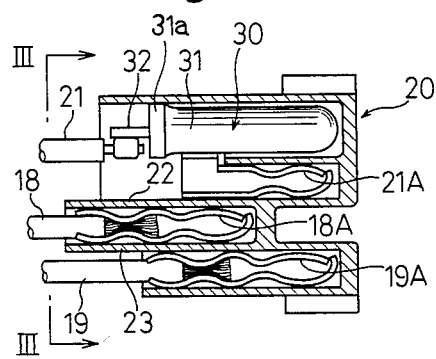
FIG. 2 is an enlarged longitudinal section of a socket assembly shown in FIG. 1.
Figure 3:
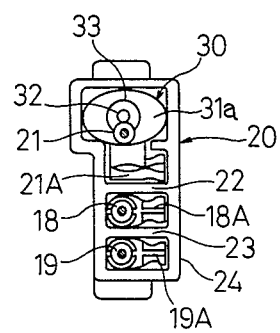
FIG. 3 is a side view taken along line III—III in FIG. 2 as seen in the direction of arrow.
Figure 5:
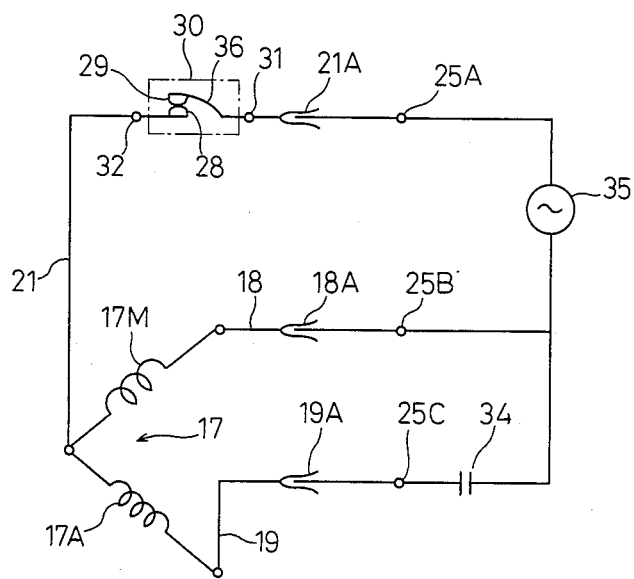
FIG. 5 is a wiring diagram showing the connection between the enclosed electric compressor in FIG. 1 and an external circuit.
Figure 6:
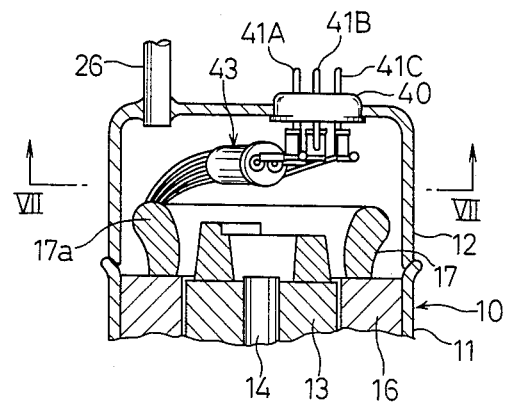
FIG. 6 is a partially longitudinal section of the motor protector mounting structure of a second embodiment.

As shown in FIG. 2, a lead 18 from a main winding 17M and a lead 19 from an auxiliary winding 17a are connected to receptacles 18A and 19A held in a socket 20 formed of a phenolic resin or the like, respectively. The receptacles 18A and 19A are electrically insulated from each other by a partition wall 23 and held in the socket 20. A lead 21 extending from a connection common to the main and auxiliary windings 17M and 17A is connected to a conductive terminal pin 32 of an internal motor protector 30 which is substantially a thermally responsive switch. The conductive terminal pin 32 is secured in an aperture formed in a conductive header plate 31a closing an open end of the protector housing 31 by means of an electrically insulating material such as glass sealant 33. In the motor protector 30, as well known in the art, a thermally responsive member 36 formed of a bimetallic or other metallic plate deforms in response to the changes of the temperature, thereby opening and closing movable and fixed contacts 29 and 28 to break and make a power-supply circuit for the motor. As shown in FIG. 5, the fixed contact 28 and the thermally responsive member 36 having the movable contact 29 at its one end are provided within the protector housing 31 of the motor protector 30. The fixed contact 28 is connected to the conductive terminal 32 and the thermally responsive member 36 is connected to the protector housing 31. A receptacle 21A is conductively secured to the housing 31 of the motor protector 30 by means of welding or the like. The receptacle 21A is insulated from the receptacle 18A by a partition wall 22 and held within the socket 20, as shown in FIG. 2.

Figure 4:
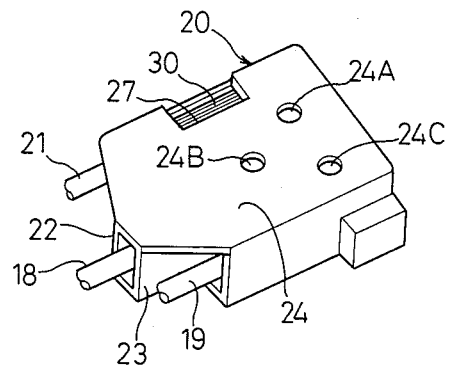
FIG. 4 is a perspective view of the socket assembly.

Referring now to FIG. 4, three apertures 24A, 24B and 24C are provided in an outer wall 24 of the socket 20 so as to correspond to the receptacles 21A, 18A and 19A respectively. A terminal support 25 is inserted into an opening formed in an upper portion of the lid 12 and secured in position air-tightly. Portions of the conductive pins 25A, 25B and 25C projecting out of the terminal support 25 within the compressor housing 10 are inserted through the apertures 24A–24C of the socket 20 respectively and electrically connected to the respective receptacles 21A, 18A and 19A, as shown by dotted line in FIG. 1. One end of the main winding 17M is connected through the lead 18 to the receptacle 18A. One end of the auxiliary winding 17A is connected through the lead 19 to the receptacle 19A. The other ends of the main and auxiliary windings 17M and 17A are connected in common through the lead 21 to the terminal pin 32 of the motor protector 30. An exhaust pipe 26 is inserted through an opening formed at a coolant gas exhausting side, for example, in the upper portion of the lid 12 and air-tightly secured in position. When compressed, the coolant gas is forced to flow through the exhaust pipe 26.

When the conductive pins 25A–25C are connected to a capacitor 34 and a power-supply source 35 as shown in FIG. 5, the electrical power is supplied to the windings 17 of the motor. The rotor 13 is rotated to thereby drive the compressing means 15. Drive of the compressing means 15 causes the coolant gas to flow through the gap (not shown) between the stator 16 and the inside wall surface of the compressor housing 10 and also a gap between the stator 16 and the rotor 13 in the axial direction. The compressed coolant gas is then forced to flow through the exhaust pipe 26 and passes by a condenser, an evaporator (both not shown) and the like. When drive of the compressing means is topped, the coolant gas is forced to flow back into the compressor housing 10 through the exhaust pipe 26. Since the motor protector 30 is provided at the upper portion of the interior of the compressor housing 10, heat generated by the motor is transferred by the compressed coolant gas. Accordingly, the same characteristics of protecting the motor against the overload or overcurrent can be obtained as in the case where the motor protector of the type described above is bound to the winding of the motor with string conventionally. Further improvement of the motor protecting characteristics can be attained when an aperture 27 is provided in the wall of the socket 20 enclosing the motor protector 30 so that the compressed coolant gas flows touching the protector 30 well, as shown in FIG. 4.

According to the motor protector mounting structure of the first embodiment, the conductive pins 25A, 25B and 25C provided in the terminal support 25 for supply of the electric power to the motor are engaged with a plurality of receptacles 21A, 18A and 19A which are held in the socket 20 formed of an insulating material. Further, the internal motor protector 30 is conductively secured to the receptacle 21A within the socket 20. Consequently, the work of mounting the motor protector on the enclosed compressor is simplified when the motor protector mounting structure of this invention is compared with the conventional method of binding the motor protector to the stator winding of the motor, though the socket need be rendered rather large. Furthermore, provision of an extra space around the motor need not be taken into consideration and the compressor housing in which the motor and the compressing means are provided need not be rendered large. Thus, excessive use of material can effectively be avoided in assembling the compressor.

Figure 7:
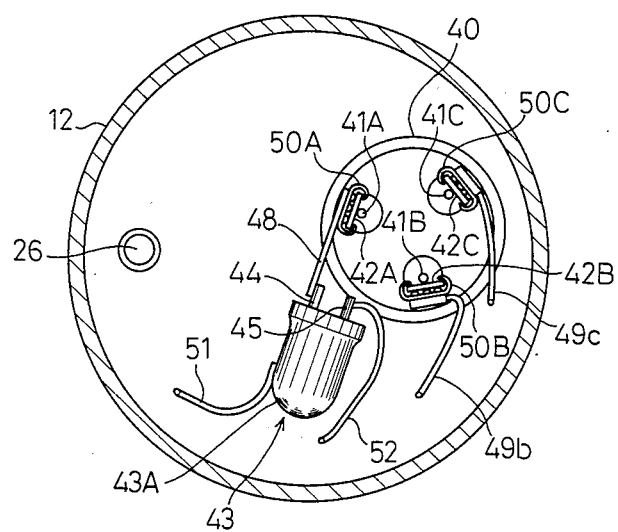
FIG. 7 is an enlarged sectional view taken along line VII—VII in FIG. 6.
Figure 8:
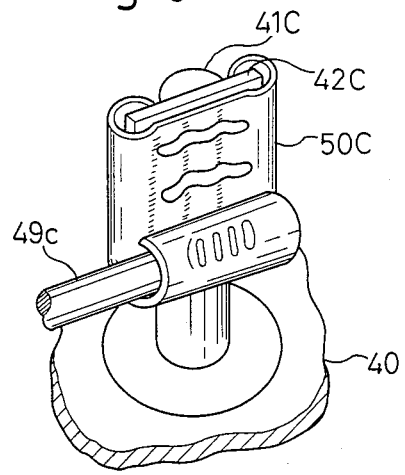
FIG. 8 is a partially enlarged perspective view of the motor mounting structure in FIG. 7.
Figure 9:
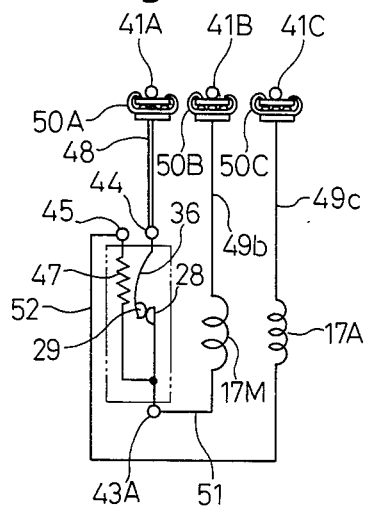
FIG. 9 is a wiring diagram showing the connection between the motor protector mounting structure in FIG. 6 and the thermally responsive switch means.

A second embodiment of the invention will now be described with reference to Figs.6–9. Plate-shaped tabs 42A, 42B and 42C are secured, by means of welding or the like, to portions of respective conductive pins 41A, 41B and 41C provided in the terminal support 40, which portions project out of the terminal support 40 within the compressor housing 10. One of the tabs is shown in FIG. 8. The motor protector 43 is so designed that the terminal pins 44 and 45 are electrically insulated from the protector housing 43A. As shown in FIG. 9, the terminal pin 44 is connected to the thermally responsive member 36 which has a movable contact 29 at its one end. A terminal pin 45 is connected to one end of an auxiliary heating member 47 which applies heat to the thermally responsive member 36 for its deformation. The other end of the auxiliary heating member 47 and the fixed contact 28 are electrically connected to the protector housing 43A. One end of a support 48 formed of a tough conductive material is connected to the terminal pin 44 to which the thermally responsive member 36 is connected. The other end of the support 48 and ends of coil wires 49B and 49C, corresponding to one ends of the main and auxiliary windings 17M and 17A, are rigidly connected to a receptacle 50A for protector connection and receptacles 50B and 50C for coil connection by way of welding, respectively. The other ends 51 and 52 of the coil wires, which correspond to the other ends of the main and auxiliary windings 17M and 17A in the first embodiment, are connected to the housing 43A of the motor protector 43 and the terminal pins 45, respectively. The receptacles 50A, 50B and 50C, thus connected, are electrically connected to the tabs 42A, 42B and 42C welded to the conductive pins 41A, 41B and 41C provided in the terminal support 40. In this case, it is preferable that the coil wires 49B, 49C, 51 and 52 are insulated by thermally contractible polyester tubes and are fixed in a lump or that those are bundled with a piece of string and fixed.

According to the motor protector mounting structure of the second embodiment, the motor protector 43 is mechanically mounted on the conductive pin 41A of the terminal support 40 and supported in position by the support 48 serving as a connection lead, with the receptacle 50A and the tab 42A provided therebetween. Since the support 48 is formed into a simple configuration, it does not need much space. Further, extra leads may not be employed in connection of the coil wires 49B and 49C to the receptacles 50B and 50C respectively. Consequently, the wiring work can be simplified.

Figure 10:
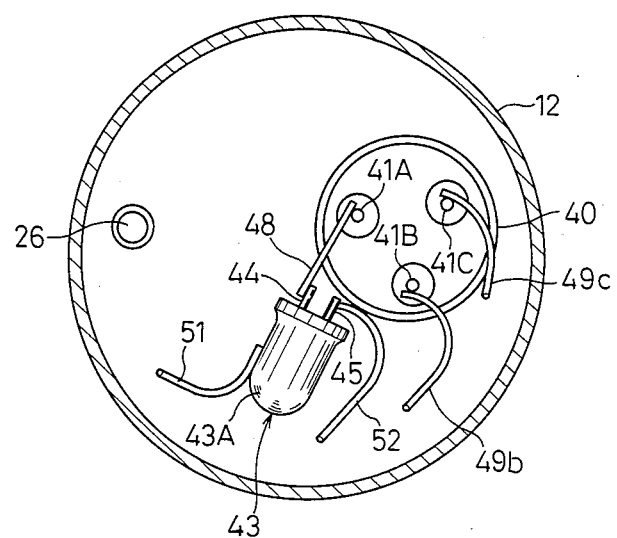
FIG. 10 is a view similar to FIG. 7 showing the motor protector mounting structure of a third embodiment.

The configuration of the receptacles 50A, 50B and 50C may be modified so as to directly engage with respective conductive pins 41A, 41B and 41C without employing the tabs 42A, 42B and 42C. Furthermore, as shown in FIG. 10 as a third embodiment, the ends of the support 48 and the coil wires 49B and 49C may directly be welded to the conductive pins 41A, 41B and 41C respectively. The arrangements of the above-described modification and the third embodiment can attain the same effect as in the first embodiment.

Furthermore, when the auxiliary heating member 47 is denecessitated, short circuit may be effected between the terminal 45 and the protector housing 43A. See FIG. 5.

Figure 11:
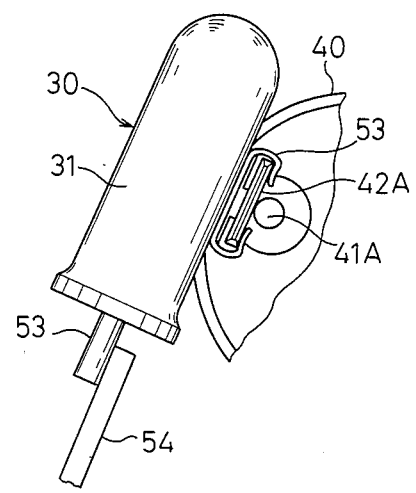
FIG. 11 is a perspective view of the motor protector mounting structure of a fourth embodiment.

FIG. 11 illustrates a fourth embodiment. The protector supporting receptacle 53 is secured to the outside surface of the housing 31 of the motor protector 30 by means of welding or the like. The receptacle 53 is conductively engaged with the tab 42A conductively fixed to the conductive pin 41A of the terminal support 40 which has the same construction as shown in Figs.7 and 8. Accordingly, the receptacle 53 serves for both the electrical connection to the protector 30 and the support thereof. In the motor protector 30 shown in FIG. 11, the fixed contact 28 is connected to the protector housing 31 and the thermally responsive member having a movable contact at its one end is connected to the terminal 55. The auxiliary heating member is not employed in the motor protector 30. The coil wire 54 of the motor is connected to the terminal 55.

The foregoing disclosure and drawings are merely illustrative of the principles of the present invention and are not to be interpreted in a limiting sense. The only limitation is to be determined from the scope of the appended claims.

What is claimed is:

1. A motor protector mounting structure for an enclosed electric compressor comprising a closed compressor housing containing coolant gas, a compressing means and an electric motor within said compressor housing, said motor having a stator core secured to the inside surface of the compressor housing and windings exposed to the coolant gas, and an exhaust pipe communicating to an interior of the compressor housing whereby the coolant gas, when compressed, is forced to flow through the exhaust pipe, said motor protector mounting structure comprising:
    (a) a terminal support provided in a wall of the compressor housing;
    (b) a plurality of electrically conductive pins in said terminal support wherein one end of each said pin projects out of said terminal support within the compressor housing and the other end of each said pin is connectable to an external circuit outside the compressor housing;
    (c) a socket secured to said terminal support within the compressor housing, said socket having a plurality of receptacles for engaging said conductive pins respectively for electrical connection;
    (d) a thermally responsive switch means within said socket; one of said receptacles being connected to a terminal portion of said thermally responsive switch means; and the others of said receptacles being connected to leads extending from the winding of the motor.

2. A motor protector mounting structure for an enclosed electric compressor comprising a closed compressor housing having a coolant gas, a compressing means and an electric motor within said compressor housing, said motor having a stator core secured to the inside surface of the compressor housing and windings exposed to the coolant gas, and an exhaust pipe communicating to an interior of the compressor housing whereby the coolant gas, when compressed, is forced to flow through the exhaust pipe, said motor protector mounting structure comprising:

(a) a terminal support provided in a wall of the compressor housing;

(b) a plurality of electrically conductive pins in said terminal support wherein one end of each said pin projects out of said terminal support within the compressor housing and so that the other end of each said pin is connectable to an external circuit outside the compressor housing;

(c) a thermally responsive switch means including an enclosed metallic housing, a fixed contact within the metallic housing, a thermally responsive member within the metallic housing, said thermally responsive member having a movable contact at its one end in cooperative relation to the fixed contact and at least one terminal pin, each of the fixed contact and the thermally responsive member being connected to either the terminal pin or the enclosed metallic housing, the enclosed metallic housing being connected at its outer surface thereof to a coil wire forming the windings of the motor;

(d) a plurality of receptacles engaged with said conductive pins provided in said terminal support, respectively, any one of said receptacles being connected to a coil wire forming the windings of the motor; and (e) a support having two ends, said support being conductively connected at one end thereof to one of said receptacles which is disconnected from the coil wire of the motor windings and being connected at the other end thereof to the terminal pin provided for said thermally responsive switch means so that the thermally responsive switch means is supported by said support.

3. A motor protector mounting structure for an enclosed electric compressor as set forth in claim 2, wherein a plurality of tabs are conductively secured to said conductive pins in said terminal support, respectively and wherein said receptacles are engaged with said tabs.

4. A motor protector mounting structure for an enclosed electric compressor comprising a closed compressor housing filled with coolant gas, a compressing means and an electric motor within said compressor housing, said motor having a stator core secured to the inside surface of the compressor housing and windings exposed to the coolant gas, and an exhaust pipe communicating to an interior of the compressor housing wherein the coolant gas, when compressed, is forced to flow through the exhaust pipe, said motor protector mounting structure comprising:

(a) a terminal support in a wall of the compressor housing;

(b) a plurality of electrically conductive pins in said terminal support so that one end of each said pin projects out of said terminal support within the compressor housing and the other end of each said conductive pin is connected to an external circuit outside the compressor housing;

(c) a thermally responsive switch means including an enclosed metallic housing, a fixed contact provided within the enclosed metallic housing, a thermally responsive member within the metallic housing and having a movable contact at its one end in cooperative relation to the fixed contact, and at least one terminal pin, each of the fixed contact and the thermally responsive member being connected to either the terminal pin or the enclosed metallic housing, the enclosed metallic housing being connected to a coil wire forming the windings of the motor; and (d) a support having two ends, said support being connected at its one end to one of said conductive pins and connected at its other end to the terminal of said thermally responsive switch means for supporting it.

5. A motor protector mounting structure for an enclosed electric compressor comprising a closed compressor housing filled with a coolant gas, and a compressing means, both within said compressor housing, an electric motor having a stator core secured to the inside surface of the compressor housing and windings exposed to the coolant gas, and an exhaust pipe communicating to an interior of the compressor housing whereby the coolant gas, when compressed, is forced to flow through the exhaust pipe, said motor protector mounting structure comprising:

(a) a terminal support in a wall of the compressor housing;

(b) a plurality of electrically conductive pins in said terminal support, one end of each of said conductive pin projecting out of the terminal support within the compressor housing and the other end of each of said conductive pin connectable to an external circuit outside the compressor housing;

(c) a thermally responsive switch means including an enclosed metallic housing, a fixed contact within the enclosed metallic housing, a thermally responsive member within the enclosed metallic housing and having a movable contact at its one end in cooperative relation to the fixed contact, and at least one terminal pin, each of the fixed contact and the thermally responsive member being connected to either the terminal pin or the enclosed metallic housing, the enclosed metallic housing being connected to a coil wire forming the windings of the motor;

(d) a plurality of first receptacles engaged with said conductive pins respectively, one of said first receptacles being connected to a coil wire forming the windings of the motor; and (e) a second receptacle conductively secured to the outside surface of the metallic housing of the thermally responsive switch means, said second receptacle being conductively engaged with one of said conductive pins.

* * * * *